US012023930B2

(12) United States Patent
Watanabe

(10) Patent No.: US 12,023,930 B2
(45) Date of Patent: Jul. 2, 2024

(54) INKJET HEAD AND INKJET RECORDING APPARATUS

(71) Applicant: TOSHIBA TEC KABUSHIKI KAISHA, Tokyo (JP)

(72) Inventor: Hiroyuki Watanabe, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 113 days.

(21) Appl. No.: 17/828,476

(22) Filed: May 31, 2022

(65) Prior Publication Data

US 2023/0059292 A1 Feb. 23, 2023

(30) Foreign Application Priority Data

Aug. 20, 2021 (JP) ................................ 2021-134684

(51) Int. Cl.
*B41J 2/045* (2006.01)
*B41J 2/14* (2006.01)

(52) U.S. Cl.
CPC ......... *B41J 2/1433* (2013.01); *B41J 2/04588* (2013.01); *B41J 2/04598* (2013.01); *B41J 2002/14338* (2013.01); *B41J 2002/14411* (2013.01)

(58) Field of Classification Search
None
See application file for complete search history.

(56) References Cited

U.S. PATENT DOCUMENTS 9,694,577 B2 7/2017 Nitta et al.
9,950,521 B2 4/2018 Nitta et al.
2008/0252672 A1* 10/2008 Komai ................. B41J 2/04541 347/11
2012/0236052 A1* 9/2012 Tobita .................. B41J 2/04581 347/10
2014/0327714 A1* 11/2014 Iwata ................... B41J 2/04596 347/11
2017/0341384 A1* 11/2017 Ichikawa ............. B41J 2/04586
2018/0264810 A1* 9/2018 Harada ................ B41J 2/04595

FOREIGN PATENT DOCUMENTS

JP 2016034720 A * 3/2016

OTHER PUBLICATIONS

Norkoshi, Machine TranslationofJP-2016034720-A, 2016 (Year: 2016).*

* cited by examiner

*Primary Examiner* — Scott A Richmond
(74) *Attorney, Agent, or Firm* — Kim & Stewart LLP

(57) ABSTRACT

According to one or more embodiments, the inkjet head includes an actuator and a driver. The actuator causes a pressure chamber to expand or contract. The driver applies an ejection pulse to the actuator to eject ink from the pressure chamber. The ejection pulse includes an expansion pulse having a width of 0.75 to 1.25 times a pressure propagation time of the pressure chamber, a rest period after the expansion pulse, and a contraction pulse after the rest period.

20 Claims, 12 Drawing Sheets

FIG. 10

| UL[us] | D[us] | R[us] | P[us] | DC[us] | drop | F[kHz] | CT[us] | CD[us] |
|---|---|---|---|---|---|---|---|---|
| 1.64 | 2.04 | 1.80 | 0.9 | 5.16 | 7 | 8.71 | 114.811 | 2.16 |
| 1.64 | 1.84 | 1.92 | 0.9 | 5.08 | 7 | 8.71 | 114.811 | 2.72 |
| 1.64 | 1.64 | 2.00 | 0.9 | 4.96 | 7 | 8.71 | 114.811 | 3.56 |
| 1.64 | 1.44 | 2.10 | 0.9 | 4.86 | 7 | 8.71 | 114.811 | 4.26 |
| 1.64 | 1.24 | 2.22 | 0.9 | 4.78 | 7 | 8.71 | 114.811 | 4.82 |

INKJET HEAD AND INKJET RECORDING APPARATUS

CROSS-REFERENCE TO RELATED APPLICATION

This application is based upon and claims the benefit of priority from Japanese Patent Application No. 2021-134684, filed Aug. 20, 2021, the entire contents of which are incorporated herein by reference.

FIELD

Embodiments described herein relate generally to an inkjet head and an inkjet recording apparatus.

BACKGROUND

An inkjet head applies an ejection pulse to an actuator that causes a pressure chamber to contract and expand such that ink droplets are ejected from the pressure chamber onto a medium, such as a sheet of paper. The inkjet head continuously ejects ink droplets to perform printing.

To increase the speed of printing, a technique for shortening the ejection pulse is desired.

Hence, there is a need for an inkjet head and an inkjet recording apparatus which are capable of shortening an ejection pulse and increasing speed of printing.

DESCRIPTION OF THE DRAWINGS

FIG. 10 is a table of example data of ejection pulses according to an embodiment.

DETAILED DESCRIPTION

According to one or more embodiments, an inkjet head includes an actuator and a driver. The actuator causes a pressure chamber to expand or contract. The driver applies an ejection pulse to the actuator to eject ink (or a liquid) from the pressure chamber. The ejection pulse includes an expansion pulse having a width of 0.75 to 1.25 times a pressure propagation time of the pressure chamber, a rest period after the expansion pulse, and a contraction pulse after the rest period.

Hereinafter, certain example embodiments of an inkjet recording apparatus will be described with reference to the accompanying drawings. The inkjet recording apparatus according to the embodiments uses an inkjet head to form an image on a medium, such as a sheet of paper. The inkjet recording apparatus ejects ink droplets in a pressure chamber included in the inkjet head onto the medium to print an image on the medium. For example, the inkjet recording apparatus is an office inkjet recording apparatus, a bar code inkjet recording apparatus, a point-of-sale (POS) inkjet recording apparatus, an industrial inkjet recording apparatus, a 3D inkjet recording apparatus, and the like. The medium on which an image is formed by the inkjet recording apparatus is not limited to any specific configuration. The inkjet head according to the embodiments is an example of a liquid ejection head, and the ink is an example of a liquid. The inkjet head or the liquid ejection head may be included in a printer.

Figure 1:
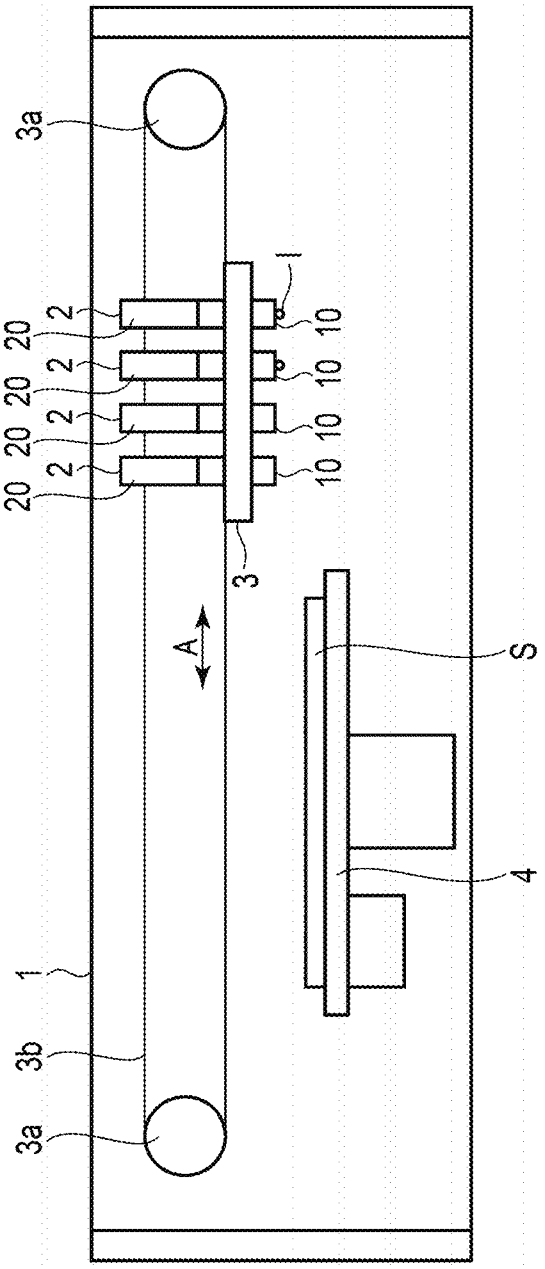
FIG. 1 is a schematic diagram of an example configuration of an inkjet recording apparatus according to an embodiment.

FIG. 1 is a schematic diagram of an example configuration of an inkjet recording apparatus 1 according to one embodiment.

The inkjet recording apparatus 1 according to the present embodiment forms an image on an image forming medium S using a recording material, such as an ink. As an example, the inkjet recording apparatus 1 includes a plurality of liquid ejection parts (may also be referred to as liquid ejection units) 2, a head support mechanism 3 that movably supports the liquid ejection parts 2, and a medium support mechanism (may also be referred to as a medium support portion) 4 that movably supports the image forming medium S. For example, the image forming medium S is a sheet made of paper, cloth, resin, or the like.

The plurality of liquid ejection parts 2 are arranged in parallel in a predetermined direction and supported by the head support mechanism 3. The head support mechanism 3 is attached to an endless belt 3*b* supported by a roller 3*a*. The inkjet recording apparatus 1 moves the head support mechanism 3 in a main scanning direction A orthogonal to a conveyance direction of the image forming medium S by rotating the roller 3*a*. Each of the liquid ejection parts 2 integrally includes an inkjet head 10 and a circulation device 20. Each liquid ejection part 2 performs an ejection operation of ejecting a liquid, for example, ink I from the inkjet head 10. In the present embodiment, the inkjet recording apparatus 1 is of a scanning type which performs an ink ejection operation to form a target image on the image forming medium S that is being supported by the head support mechanism 3 at a position facing the inkjet heads 10 of the respective liquid ejection parts 2, while reciprocating or moving back and forth the head support mechanism 3 in the main scanning direction A. Alternatively, the inkjet recording apparatus 1 may be of a single-pass type which performs the ink ejection operation without moving the head support mechanism 3. In the single-pass type apparatus, it is not necessary to provide the roller 3*a* and the endless belt 3*b*, and the head support mechanism 3 may be fixed to a housing of the inkjet recording apparatus 1.

The plurality of liquid ejection parts 2 eject, for example, four color inks corresponding to cyan, magenta, yellow, and key (black) (CMYK), that is, cyan ink, magenta ink, yellow ink, and black ink, respectively.

Figure 2:
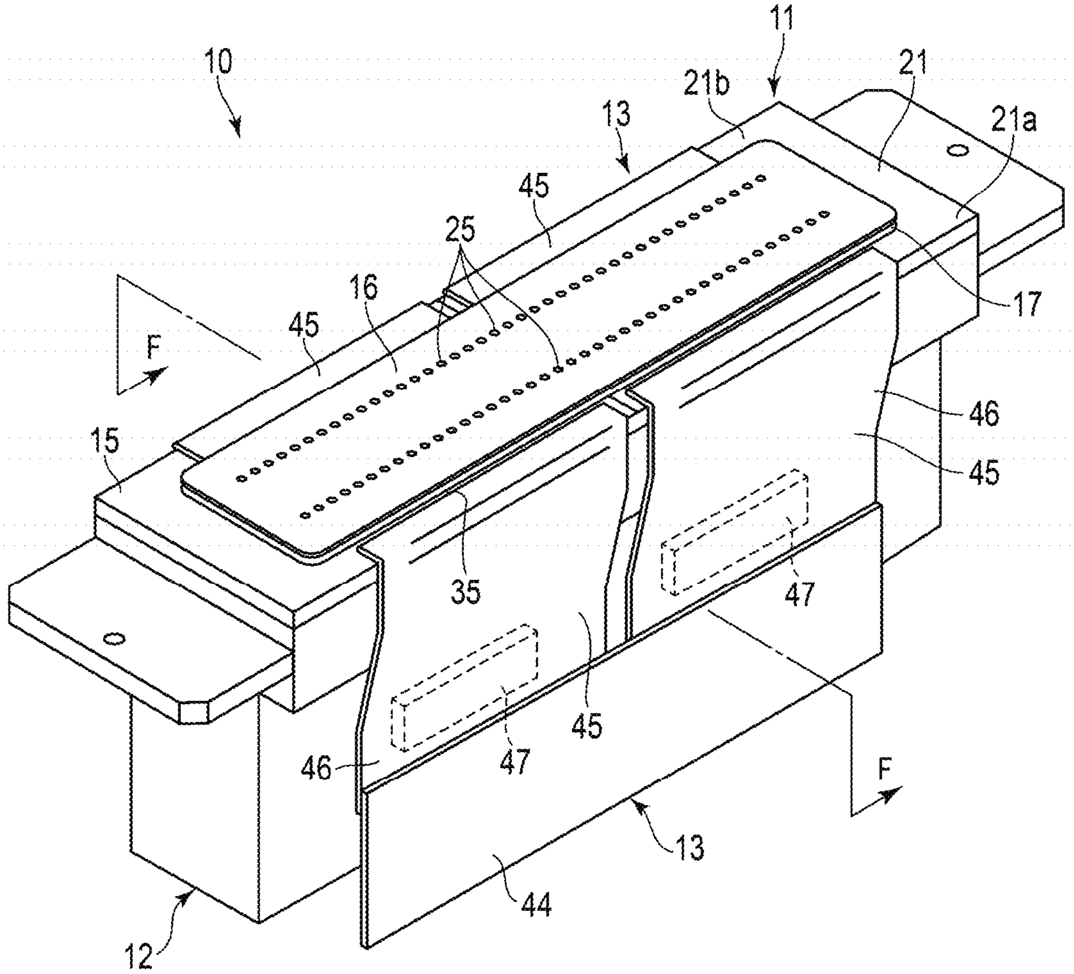
FIG. 2 depicts an inkjet head in a perspective view according to an embodiment.
Figure 3:
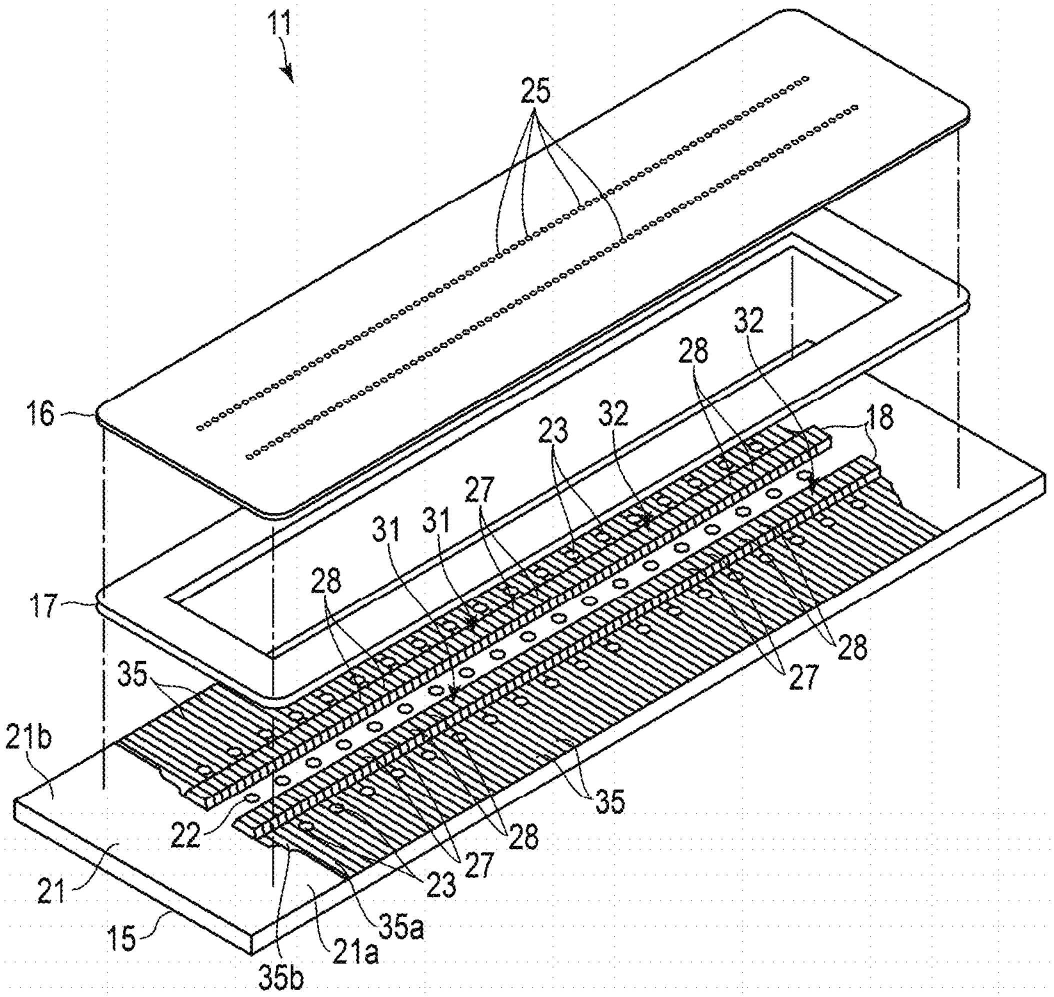
FIG. 3 depicts an inkjet in an exploded perspective view according to an embodiment.
Figure 4:
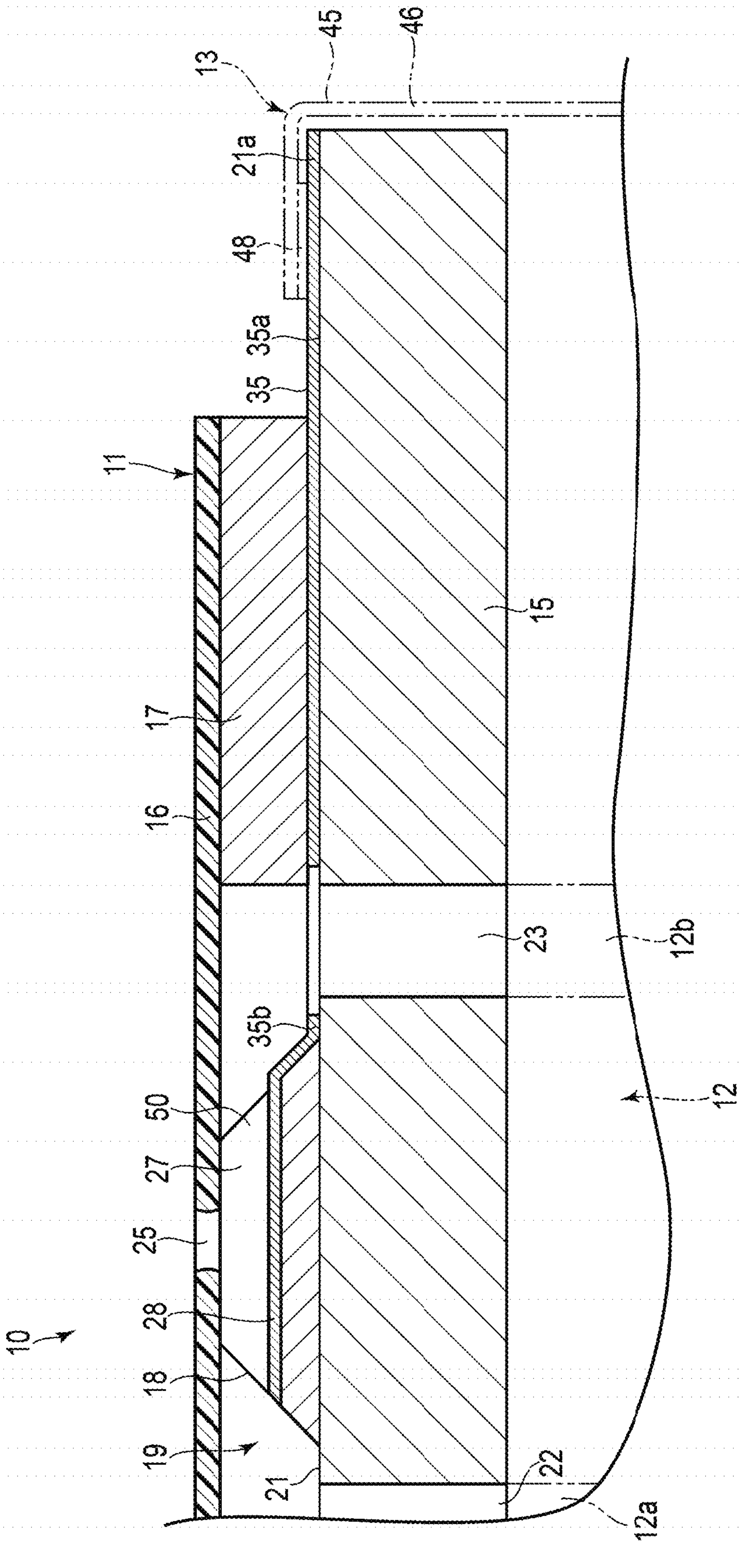
FIG. 4 depicts an inkjet head in a cross-sectional view according to an embodiment.

FIGS. 2 to 4 depict an example configuration of the inkjet head 10 according to one embodiment. FIG. 4 shows a cross-sectional view taken along line F-F of FIG. 2. The inkjet head 10 of the present embodiment in FIGS. 2 to 4 is a side shooter, circulation type inkjet head with a shear-mode shared wall design. The inkjet head 10 may be of other types as appropriate.

The inkjet head 10 is mounted on the inkjet recording apparatus 1 and is connected to an ink tank (not separately depicted) via a component, such as a tube. The inkjet head 10 includes a head main body 11, a unit portion 12, and a pair of circuit substrates 13. The inkjet head 10 of the present embodiment is an example of a waveform generation device.

The head main body 11 is a device for ejecting ink. The head main body 11 is attached to the unit portion 12. The unit portion 12 includes a manifold that forms a part of a path between the head main body 11 and the ink tank, and a member for attaching the inkjet head 10 to the inside of the inkjet recording apparatus 1. The pair of circuit substrates 13 are attached to the head main body 11.

As illustrated in FIGS. 3 and 4, the head main body 11 includes a base plate 15, a nozzle plate 16, a frame member 17, and a pair of drive elements 18. As illustrated in FIG. 4, an ink chamber 19 is formed inside the head main body 11.

The base plate 15 is formed of ceramics, such as alumina, in the shape of a rectangular plate as shown in FIG. 3. The base plate 15 includes a flat mounting surface 21. The base plate 15 includes a plurality of supply holes 22 and a plurality of discharge holes 23 that are open on the mounting surface 21.

The supply holes 22 are provided side by side in the central portion of the base plate 15 in the longitudinal direction of the base plate 15. The supply holes 22 communicate with an ink supply unit 12*a* (see FIG. 4) of the manifold of the unit portion 12. The supply holes 22 are connected to the ink tank in the circulation device 20 (see FIG. 1) via the ink supply unit 12*a*. The ink in the ink tank is supplied to the ink chamber 19 through the ink supply unit 12*a* and the supply holes 22.

The discharge holes 23 are provided side by side in two rows, with the supply holes 22 being interposed therebetween. The discharge holes 23 communicate with an ink discharge unit 12*b* (see FIG. 4) of the manifold of the unit portion 12. The discharge holes 23 are connected to the ink tank in the circulation device 20 via the ink discharge unit 12*b*. The ink in the ink chamber 19 is recovered to the ink tank through the ink discharge unit 12*b* and the discharge hole 23. The ink circulates between the ink tank and the ink chamber 19.

The nozzle plate 16 is, for example, formed of a rectangular film made of polyimide with its surface being imparted with a liquid-repellent function. The nozzle plate 16 faces the mounting surface 21 of the base plate 15. A plurality of nozzles 25 are provided on the nozzle plate 16. The plurality of nozzles 25 are arranged side by side in two rows along the longitudinal direction of the nozzle plate 16.

The frame member 17 is, for example, formed of a nickel alloy in a rectangular frame shape. The frame member 17 is interposed between the mounting surface 21 of the base plate 15 and the nozzle plate 16. The frame member 17 is adhered to the mounting surface 21 and the nozzle plate 16. The nozzle plate 16 is attached to the base plate 15 through the frame member 17. As illustrated in FIG. 4, the ink chamber 19 is formed to be surrounded by the base plate 15, the nozzle plate 16, and the frame member 17.

The drive elements 18 are formed of two plate-shaped piezoelectric bodies formed of lead zirconate titanate (PZT), for example. The two piezoelectric bodies are bonded such that the polarization directions are opposite to each other in the thickness direction.

As illustrated in FIG. 3, the pair of drive elements 18 are adhered to the mounting surface 21 of the base plate 15. As illustrated in FIG. 4, the pair of drive elements 18 are arranged in parallel in the ink chamber 19 so as to correspond to the nozzles 25 arranged in the two rows. Each of the drive element 18 is formed in a trapezoidal shape in cross section. A top portion of the drive element 18 is adhered to the nozzle plate 16.

The drive elements 18 include a plurality of grooves 27. The grooves 27 extend in a direction intersecting the longitudinal direction of the drive elements 18 and are aligned in the longitudinal direction of the drive elements 18. Each of the grooves 27 faces the corresponding one of the nozzles 25 of the nozzle plate 16. As illustrated in FIG. 4, the drive elements 18 include a plurality of pressure chambers 50 that are arranged in the respective grooves 27 and are filled with an ink.

An electrode 28 is provided to each of the grooves 27. The electrode 28 is formed by, for example, photoresist etching a nickel thin film. The electrode 28 covers an inner surface of the groove 27.

As illustrated in FIG. 3, a plurality of wiring patterns 35 are provided on the mounting surface 21 of the base plate 15. The wiring patterns 35 are formed by, for example, photoresist etching a nickel thin film.

The wiring patterns 35 extend from one side end portion 21*a* and another side end portion 21*b* of the mounting surface 21 toward the drive elements 18 in the direction intersecting the longitudinal direction of the based plate 15. Each of the side end portions 21*a* and 21*b* includes not only an edge of the mounting surface 21 but also a peripheral region thereof. In such a case, the wiring patterns 35 may be provided at an inner side than the edge of the mounting surface 21.

Hereinafter, the wiring patterns 35 extending from the one side end portion 21*a* will be described as a representative example. The basic configuration of the wiring patterns 35 of the other side end portion 21*b* is the same as that of the wiring patterns 35 of the one side end portion 21*a*.

As illustrated in FIGS. 3 and 4, the respective wiring patterns 35 include first portions 35*a* and second portions 35*b*. The first portions 35*a* extend linearly from the side end portion 21*a* of the mounting surface 21 toward the drive element 18 in the direction intersecting the longitudinal direction of the base plate 15. The first portions 35*a* are arranged in parallel with each other in the longitudinal direction of the base plate 15. The respective second portions 35*b* are arranged straddling end portions of the corresponding first portions 35*a* and the electrodes 28. The second portions 35*b* are electrically connected to the corresponding electrodes 28.

As illustrated in FIG. 3, in one drive element 18, among the plurality of electrodes 28, some electrodes 28 form a first electrode group 31 and some other electrodes 28 form a second electrode group 32.

The first electrode group 31 and the second electrode group 32 are separated by a central portion of the drive element 18 in the longitudinal direction. The second electrode group 32 is adjacent to the first electrode group 31. For example, the first and second electrode groups 31 and 32 include 159 electrodes 28, respectively.

As illustrated in FIG. 2, each of the circuit substrates 13 has a substrate main body 44 and a pair of film carrier packages (FCPs) 45. The FCPs may be tape carrier packages (TCPs).

The substrate main body 44 is a rigid printed wiring substrate formed in a rectangular shape. Various electronic components and connectors are mounted on the substrate main body 44. The pair of FCPs 45 are attached to the substrate main body 44.

Each of the FCPs 45 includes a flexible resin film 46, on which a plurality of wirings are formed, and a head drive circuit 47 connected to the plurality of wirings. The film 46 is a tape automated bonding (TAB) film. The head drive circuit 47 is an integrated circuit (IC) for applying a voltage to each of the electrodes 28. The head drive circuit 47 is fixed to the film 46 by a resin.

One end portion of the FCP 45 is thermocompression-bonded to the first portion 35*a* of each of the wiring patterns 35 by an anisotropic conductive film (ACF) 48 (see FIG. 4). As a result, the plurality of wirings of the FCP 45 are electrically connected to the wiring patterns 35.

By connecting the wirings of the FCPs 45 to the wiring patterns 35, the head drive circuit 47 is electrically connected to the electrodes 28 via the wirings of the FCP 45. The head drive circuit 47 applies a voltage to each electrode 28 via the corresponding wiring of the film 46.

If the head drive circuit 47 applies a voltage to the electrode 28, the drive element 18 deforms in the shear mode so that a volume of the pressure chamber 50 provided with the voltage-applied electrode 28 increases or decreases. As a result, a pressure of the ink in the pressure chamber 50 changes, and the ink is ejected from the corresponding nozzle 25. The drive element 18 that separates the pressure chamber 50 is an actuator for applying pressure vibration in the pressure chamber 50.

The circulation device 20 illustrated in FIG. 1 is integrally connected to an upper portion of the inkjet head 10 by a connecting component made of metal or the like. The circulation device 20 includes a predetermined circulation path configured to allow liquid (or the ink in the present embodiment) to circulate through the ink tank and the inkjet head 10. The circulation device 20 includes a pump for circulating the liquid. The liquid is supplied into the inkjet head 10 through the ink supply unit from the circulation device 20 by actions of the pump, passes through the circulation path (may also be referred to as a flow path), and then is transported from the inside of the inkjet head 10 to the circulation device 20 through the ink discharge unit 12*b*.

Further, the circulation device 20 replenishes the circulation path with liquid from a cartridge as a supply tank provided outside the circulation path.

An example circuit configuration of a main part of the inkjet recording apparatus 1 including a control system thereof will be described with reference to FIG. 5 according to one embodiment.

Figure 5:
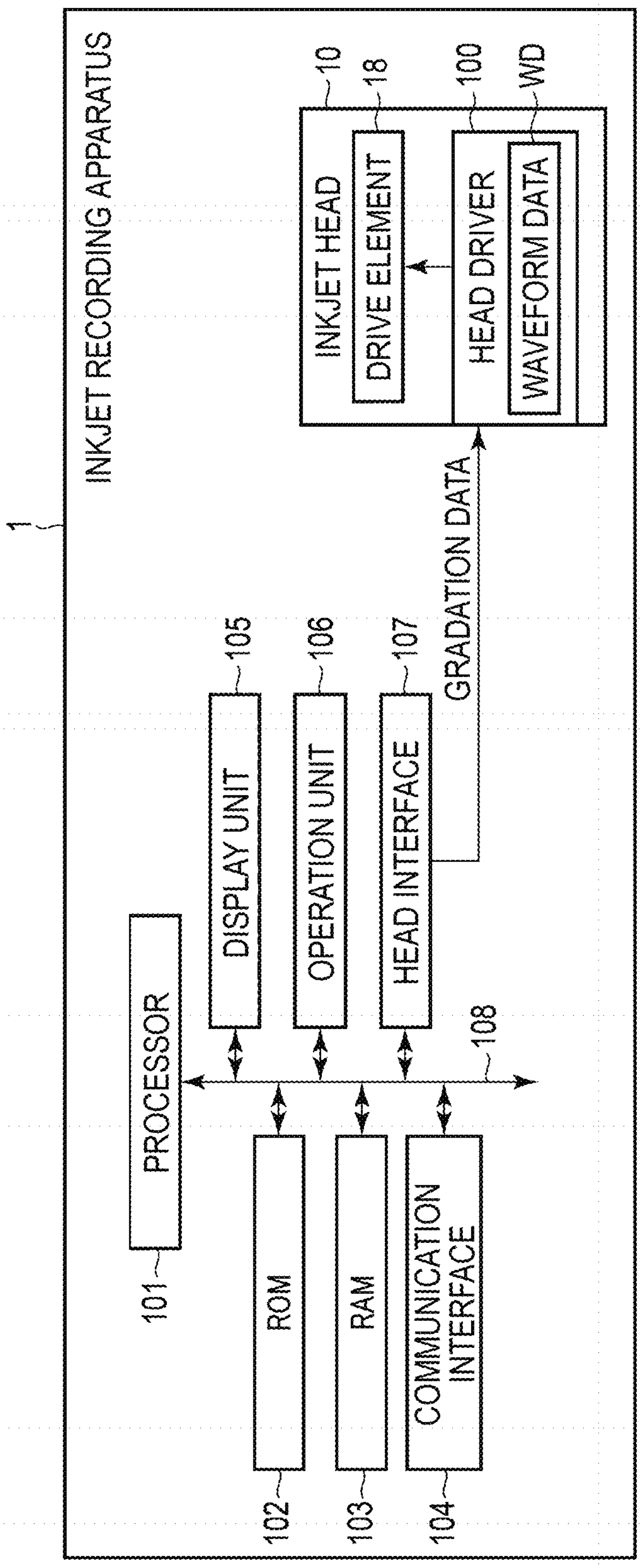
FIG. 5 is a block diagram of an example configuration of an inkjet recording apparatus according to an embodiment.

The inkjet recording apparatus 1 as shown in FIG. 5 includes a processor 101, a read-only memory (ROM) 102, a random-access memory (RAM) 103, a communication interface 104, a display unit 105, an operation unit 106, a head interface 107, a bus 108, and the inkjet head 10.

The processor 101 corresponds to a central part of a computer that performs processing and controls the operation of the inkjet recording apparatus 1. The processor 101 controls parts, components, elements, units, or the like of the inkjet recording apparatus 1 to realize various functions of the inkjet recording apparatus 1 based on one or more programs, such as system software, application software, firmware, and the like, stored in the ROM 102. For example, the processor 101 is a central processing unit (CPU), a micro processing unit (MPU), a system on a chip (SoC), a digital signal processor (DSP), a graphics processing unit (GPU), or the like. The processor 101 may be a combination of these.

The ROM 102 is a non-volatile memory used exclusively for reading data and corresponds to a main memory portion of the computer having the processor 101 as its central part. The ROM 102 stores the programs. Further, the ROM 102 stores data or various set values used by the processor 101 to perform various processes.

The RAM 103 is a memory used for reading and writing data and corresponds to a main memory portion of the computer having the processor 101 as its central part. The RAM 103 is used as a work area or the like for temporarily storing data used by the processor 101 to perform various processes.

The communication interface 104 is for the inkjet recording apparatus 1 to communicate with a host computer or the like via a network, a communication cable, or the like.

The display unit 105 displays a screen for notifying an operator of the inkjet recording apparatus 1 of various information. For example, the display unit 105 is a display, such as a liquid crystal display and an organic electro-luminescence (EL) display.

The operation unit 106 receives an operation by an operator of the inkjet recording apparatus 1. For example, the operation unit 106 is a keyboard, a keypad, a touch pad, a mouse, and the like. For the operation unit 106, a touch pad arranged to be superimposed on a display panel of the display unit 105 may also be used. For example, the display panel provided on the touch panel can be used as the display unit 105, and the touch pad provided on the touch panel can be used as the operation unit 106.

The head interface 107 is provided for the processor 101 to communicate with the inkjet head 10. The head interface 107 transmits gradation data and the like to the inkjet head 10 under the control of the processor 101.

The bus 108 includes a control bus, an address bus, a data bus, and the like and transmits signals transmitted and received by parts, components, elements, units, or the like of the inkjet recording apparatus 1.

The inkjet head 10 includes a head driver 100.

The head driver 100 is a drive circuit for operating the inkjet head 10. The head driver 100 includes the head drive circuit 47 (see FIG. 2) and the like. For example, the head driver 100 is a line driver. The head driver 100 stores waveform data WD.

The head driver 100 repeatedly generates a single drive signal based on the waveform data WD. Then, the head driver 100 controls the number of times the droplets are ejected to each pixel on the image forming medium S based on the gradation data. One ink (that is a main droplet) is ejected from the nozzle 25 each time a single ejection pulse is applied. Accordingly, the inkjet recording apparatus 1 expresses shading based on the number of inks or ink droplets ejected to each pixel, for example. The more sets of inks or ink droplets are ejected for one pixel, the darker the density of the corresponding color of the corresponding pixel is.

The head driver 100 is an example of a waveform generation device. Further, the head driver 100 operates as a generation unit that generates a drive signal.

In one instance, the head driver 100 having the waveform data WD stored therein is provided to an administrator of the head driver 100 or the like. In another instance, the head driver 100 may be provided to an administrator, a serviceman or the like without the waveform data WD stored in the head driver 100. Alternatively, the head driver 100 may be provided to an administrator, a serviceman or the like with other data stored therein. Then, the waveform data WD may be separately provided to the administrator, the serviceman or the like and written to the head driver 100 under the operation of the administrator, the serviceman, or the like. Such provision of the waveform data WD can be implemented, for example, by recording the waveform data WD on a removable storage medium, such as a magnetic disk, a magneto-optical disk, an optical disk, a semiconductor memory, or the like, or by downloading the waveform data WD through a network or the like.

If the drive signal is applied, the drive element 18 which is the piezoelectric body deforms in the shear mode. Due to this deformation, the volume of the pressure chamber 50 changes.

The pressure chamber 50 of the present example is considered to be in a normal (relaxed) state if the potential of the drive signal is zero. If the potential of the drive signal is positive, the pressure chamber 50 contracts and the volume of the pressure chamber 50 decreases as compared with the normal state. If the potential of the drive signal is negative, the pressure chamber 50 expands and the volume of the pressure chamber 50 increases as compared with the normal state. With such changes in volume of the pressure chamber 50, the pressure on the ink in the pressure chamber 50 changes. When an ejection pulse having a specific waveform is applied, the inkjet head 10 ejects ink.

Next, an example of various states of the pressure chamber 50 will be described. The pressure chamber 50 changes between a standby state, a PULL state, or a PUSH state.

First, the standby state will be described with reference to FIG. 6.

Figure 6:
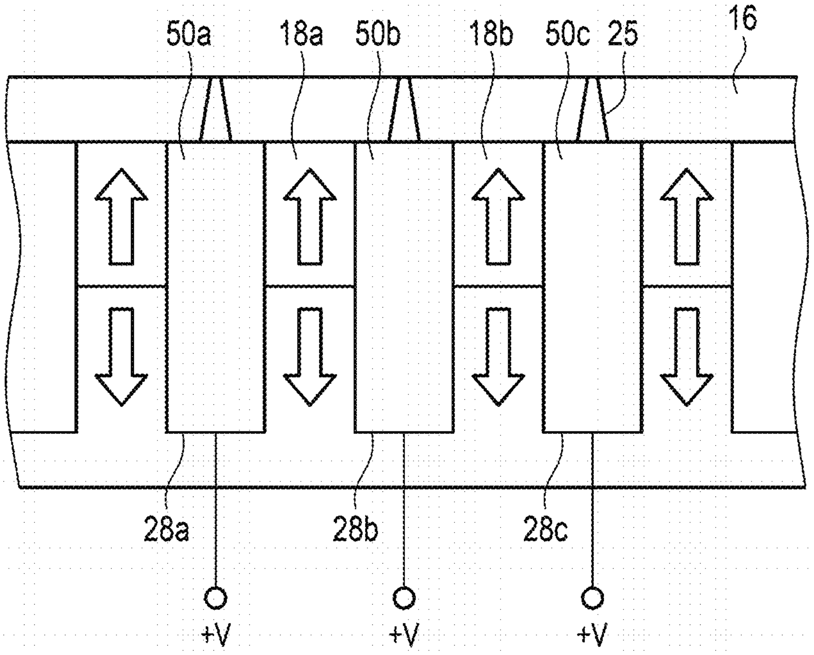
FIG. 6 depicts an example operation of an inkjet head according to an embodiment.

In the example, pressure chambers 50*a*, 50*b*, and 50*c* as pressure chambers 50 are shown in FIG. 6, but the pressure chamber 50*b* will be mainly described as a representative of the three. The pressure chamber 50*b* is formed between the pressure chamber 50*a* and the pressure chamber 50*c*. The pressure chamber 50*b* is formed by a drive element 18*a* and a drive element 18*b*. Electrodes 28*a* to 28*c* are formed in the pressure chambers 50*a* to 50*c*, respectively.

In the standby state, the pressure chamber 50*b* is in a default (that is, not expanded or contracted) state. As illustrated in FIG. 6, the head driver 100 sets the potentials of the electrode 28*b* (formed in the pressure chamber 50*b*) the electrode 28*a* (formed in the pressure chamber 50*a*), and the electrode 28*c* (formed in the pressure chambers 50*c*) to the voltage +V. The drive element 18*a* (interposed between the pressure chambers 50*a* and 50*b*) and the drive element 18*b* (interposed between the pressure chambers 50*b* and 50*c*) do not cause any distortion. In some examples, the head driver 100 may set the electrodes 28*a* to 28*c* to a potential GND (ground potential).

Figure 7:
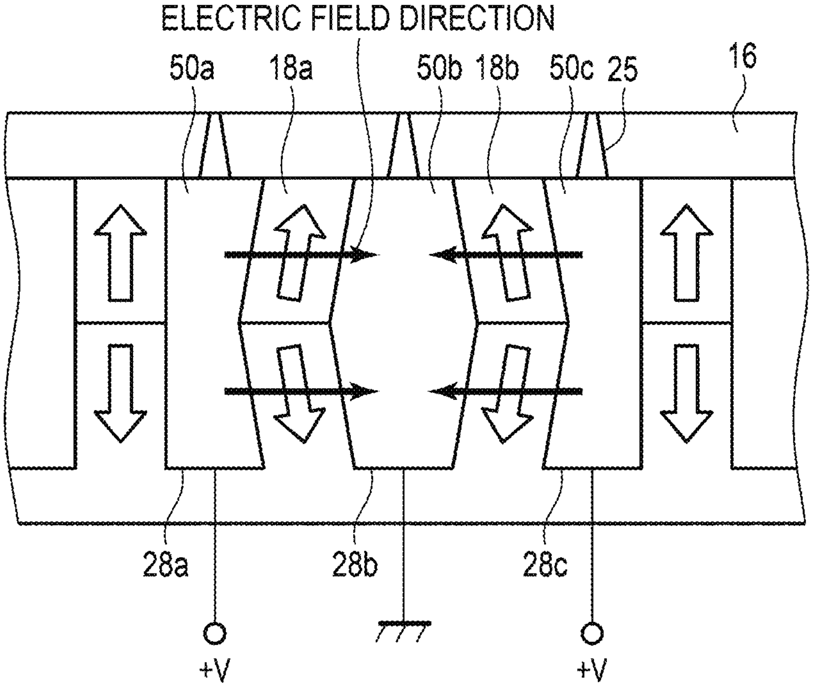
FIG. 7 depicts an example operation of an inkjet head according to an embodiment.

Next, the PULL state will be described with reference to FIG. 7.

The PULL state is a state in which the pressure chamber 50*b* is expanded. As illustrated in FIG. 7, the head driver 100 sets the electrode 28*b* to a potential GND and applies a voltage +V to the electrodes 28*a* and 28*c*. In this state, an electric field of voltage V acts across each of the drive elements 18*a* and 18*b* in a direction orthogonal to a polarization direction of the drive element 18. By this action, each of the drive elements 18*a* and 18*b* deforms outward to expand the volume of the pressure chamber 50*b*.

Figure 8:
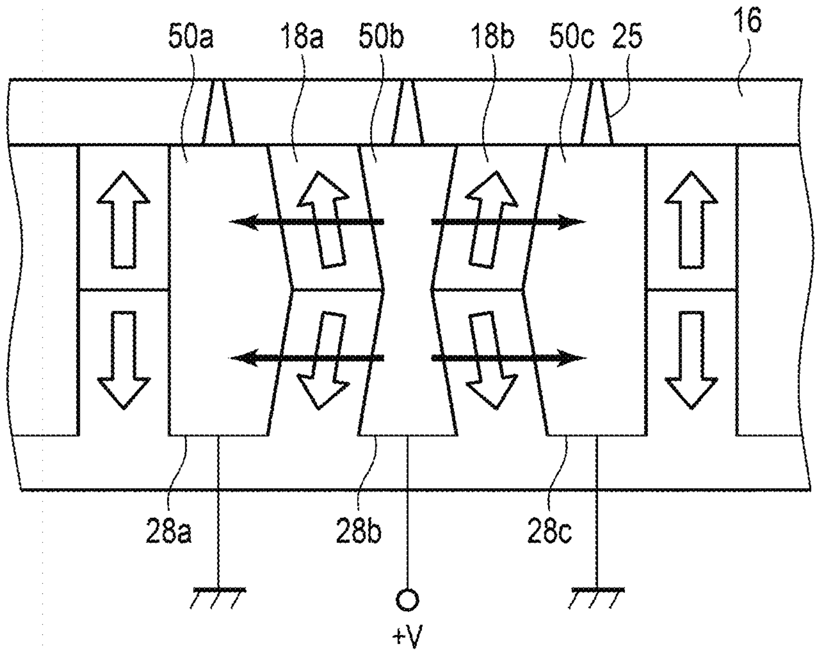
FIG. 8 depicts an example operation of an inkjet head according to an embodiment.

Next, the PUSH state will be described with reference to FIG. 8.

The PUSH state is a state in which the pressure chamber 50*b* is contracted. As illustrated in FIG. 8, the head driver 100 applies a voltage +V to the electrode 28*b* and sets the electrodes 28*a* and 28*c* to the GND potential. In this state, an electric field of voltage V acts across each of the drive elements 18*a* and 18*b* in a direction opposite to the drive voltage. By this action, each of the drive elements 18*a* and 18*b* deforms inward to contract the volume of the pressure chamber 50*b*.

When the volume of the pressure chamber 50*b* expands or contracts, a pressure vibration is generated in the pressure chamber 50*b*. By this pressure vibration, ink droplets are ejected from the nozzle 25 that communicates with the pressure chamber 50*b*.

The drive elements 18*a* and 18*b* that separate the pressure chambers 50*a*, 50*b* and 50*c* from one another are the actuators for applying (causing) a pressure vibration in the pressure chamber 50*b*. That is, a pressure chamber 50 is expanded or contracted by the operation of the drive elements 18 that form the respective walls of the pressure chamber 50.

Each pressure chamber 50 shares the drive elements 18 with the adjacent pressure chambers 50. That is, the drive elements 18 serve as partition walls between adjacent pressure chambers 50. Therefore, it may be difficult for the head driver 100 to individually drive each of the pressure chambers 50. In the present embodiment, the head driver 100 divides the pressure chambers 50 into groups of (n+1) pressure chambers (where n is an integer of 2 or more) with each pressure chamber 50 in the group being spaced from the other by n other pressure chambers 50. As one example, the pressure chambers 50 are divided into three groups with each pressure chamber in a group being separated by two other pressure chambers 50 (not in the group). With the pressure chambers 50 divided into groups in this manner, the head driver 100 can carryout so-called division driving. In the present case, three division driving is exemplified. But in other examples, the division driving may be a 4-division driving, a 5-division driving, or the like.

Next, an ejection pulse to be applied to the drive element 18 by the head driver 100 will be described with reference to FIG. 9. The head driver 100 applies the ejection pulse to the drive element 18 for ejecting a predetermined amount of ink droplets from the nozzle 25.

Figure 9:
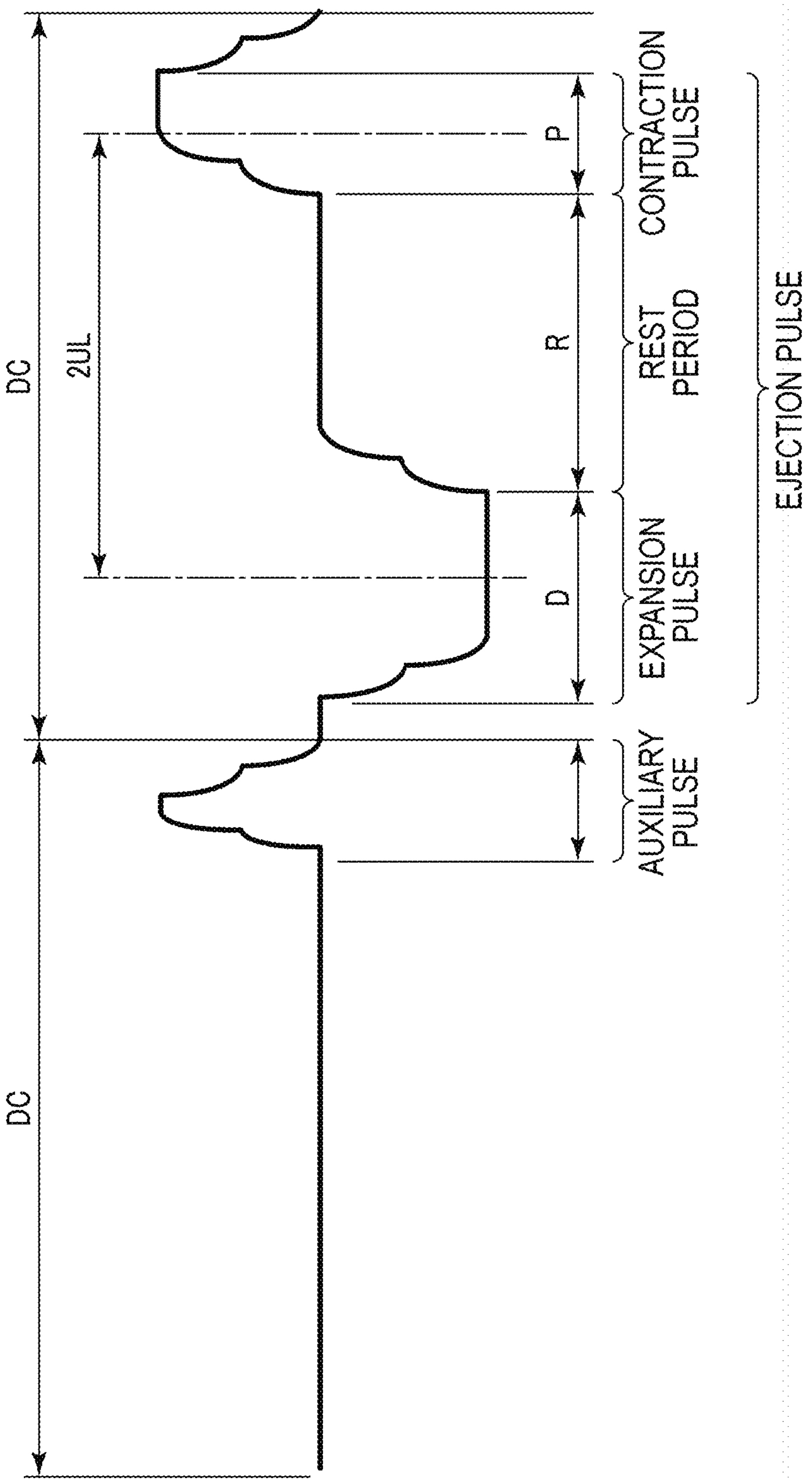
FIG. 9 depicts an example of an ejection pulse to be applied to an actuator according to an embodiment.

FIG. 9 illustrates the waveform of an ejection pulse applied by the head driver 100 to a drive element 18. In FIG. 9, the horizontal axis represents the time, and the vertical axis represents a drive voltage value. A drive voltage higher than a reference voltage (e.g., 0 V) causes the volume of the pressure chamber 50 to contract. A drive voltage lower than the reference voltage causes the volume of the pressure chamber 50 to expand.

As illustrated in FIG. 9, the head driver 100 may apply an auxiliary pulse before applying the ejection pulse to the drive element 18. The auxiliary pulse is applied prior to the ejection pulse to promote pressure vibration in the pressure chamber 50. The auxiliary pulse causes the pressure chamber 50 to contract from the standby state, and then transition back to the standby state. The auxiliary pulse is a pulse that does not cause the ejection of the ink.

For example, the head driver 100 applies the auxiliary pulse when ejecting the first ink droplet in a multi-drop drive process or before ejecting a single drop with an ejection pulse.

As illustrated in FIG. 9, the ejection pulse includes an expansion pulse, a rest period, and a contraction pulse. The ejection pulse is a pulse that causes the ejection of an ink droplet. The ejection pulse is one drop cycle (DC) long.

In the ejection pulse, the head driver 100 first applies the expansion pulse to the drive element 18. The width of the expansion pulse is denoted as width D in the drawing. The expansion pulse applies a predetermined drive voltage for a predetermined time which is equivalent to the width D of the expansion pulse.

The expansion pulse causes the volume of the pressure chamber 50 to expand. That is, the head driver 100 transitions the pressure chamber 50 from the standby state to the PULL state by application of the expansion pulse. When the pressure chamber 50 is in the PULL state, the pressure in the pressure chamber 50 decreases. If the pressure in the pressure chamber 50 decreases, ink will be supplied to the pressure chamber 50 from the ink chamber 19 (common ink chamber).

The head driver 100 provides a rest period after the application of the expansion pulse. The width of the rest period is denoted as width R in the drawing. The head driver 100 transitions the pressure chamber 50 from the PULL state back to the standby state during the rest period.

Once the rest period has elapsed, the head driver 100 applies a contraction pulse to the drive element 18. The width of the contraction pulse is denoted as width P in the drawing. The contraction pulse applies a predetermined drive voltage for a predetermined time which is equivalent to the width P of the contraction pulse. The contraction pulse causes the volume of the pressure chamber 50 to contract.

That is, the head driver 100 transitions the pressure chamber 50 from the standby state to the PUSH state. Once the predetermined time (width P) has elapsed, the head driver 100 transitions the pressure chamber 50 from the PUSH state back to the standby state.

The head driver 100 applies the ejection pulse to the drive element 18 to eject the ink from the pressure chamber 50.

As one example, the width P of the contraction pulse is 0.9 μs.

A difference between a center of the expansion pulse and that of the contraction pulse is 2 UL in the example. Here, UL is a pressure propagation time for a pressure wave to propagate from one end of the pressure chamber 50 to another. The width R of the rest period can be calculated by the following Equation (1):

$$R=2UL-D/2-P/2$$

Next, aspects related to the setting of the width D of the expansion pulse will be described with reference to FIG. 10. In the depicted example, the head driver 100 uses multiple expansion pulses to eject multiple ink droplets.

FIG. 10 illustrates various parameters of an ejection pulse applied by the head driver 100 to the drive element 18. In FIG. 10, the head driver 100 applies to the drive element 18 five ejection pulses each having a different width D value.

FIG. 10 shows columns for values of the parameters "UL", "D", "R", "P", "DC", "drop", "F", "CT" and "CD" in association with each other.

The values for "UL" are the pressure propagation time of the relevant pressure chamber 50 and, in the example, is 1.64 μs for all five ejection pulses.

The values for "D" are the width of the expansion pulses applied in the multi-drop process. In the example, "D" 2.04 μs (UL+0.4 μs, 1.25 times UL) for the first ejection pulse, 1.84 μs (UL+0.2 μs) for the second ejection pulse, 1.64 μs (equal to UL) for the third ejection pulse, 1.44 μs (UL−0.2 μs) for the fourth ejection pulse, and 1.24 μs (UL−0.4 μs, 0.75 times UL) for the fifth ejection pulse.

The values for "R" are the width of the rest period and is the value calculated by Equation (1) given the values of the other relevant parameters for each ejection pulse.

The values for "P" are the width of the contraction pulse and is a constant 0.9 μs for each of the ejection pulses.

The values for "DC" are the drop cycle length. In general, the value for "DC" decreases as values for "D" decrease.

The values for "drop" represent the maximum number of ink droplets that can be ejected in the multi-drop drive process. In the example, value for "drop" is set to 7 for all five ejection pulses.

The values for "F" represent a drive frequency. In the example, "F" is set to 8.71 kHz for all five ejection pulses.

The values for "CT" are a cycle time required for the three-divided channels to sequentially perform a multi-drop drive. In the example, "CT" is set to 114.811 μs for all five ejection pulses.

The values for "CD" are a cycle delay indicating the minimum time required between ejection pulses. Values for "CD" increase as values for "DC" decrease.

Figure 11:
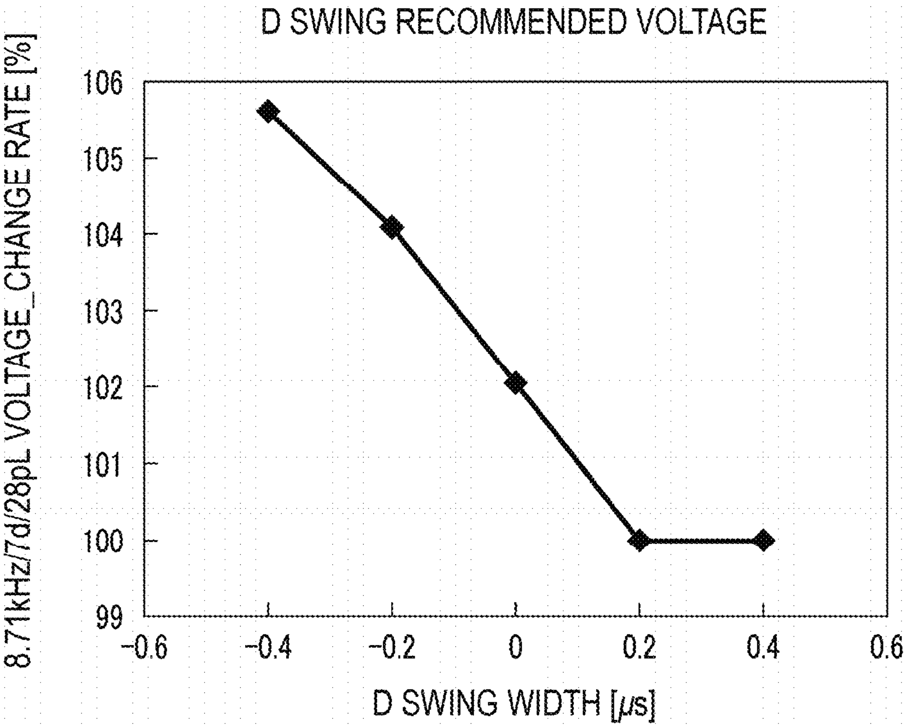
FIG. 11 is a graph of an example relationship between an expansion pulse width and a voltage change rate according to an embodiment.

Next, an example of a relationship between the width D of the expansion pulse and the volume of the ink droplets ejected will be described with reference to FIG. 11. In the graph of FIG. 11, the horizontal axis represents a swing width (μs) that is the difference between the values of UL and D (the value obtained by subtracting UL from D). The vertical axis represents a recommended voltage of the expansion pulse for the volume of the ink droplet to be a predetermined intended value.

In the example, the recommended voltage is the voltage of the expansion pulse for which the total volume of seven ink droplets (7*d*) should be equal to 28 pL (picoliters) at drive frequency F=8.71 kHz.

The recommended voltage along the vertical axis is plotted as a voltage change rate (percentage) or ratio relative to a reference recommend voltage that is equal to the recommended voltage at the swing width of 0.2 μs and 0.4 μs.

As illustrated in FIG. 11, the recommended voltage increases as the swing width decreases (that is, as D decreases). For example, if the swing width is −0.4 μs (that is, D is UL−0.4 μs), the recommended voltage increases by about 6% from the reference recommended voltage.

Figure 12:
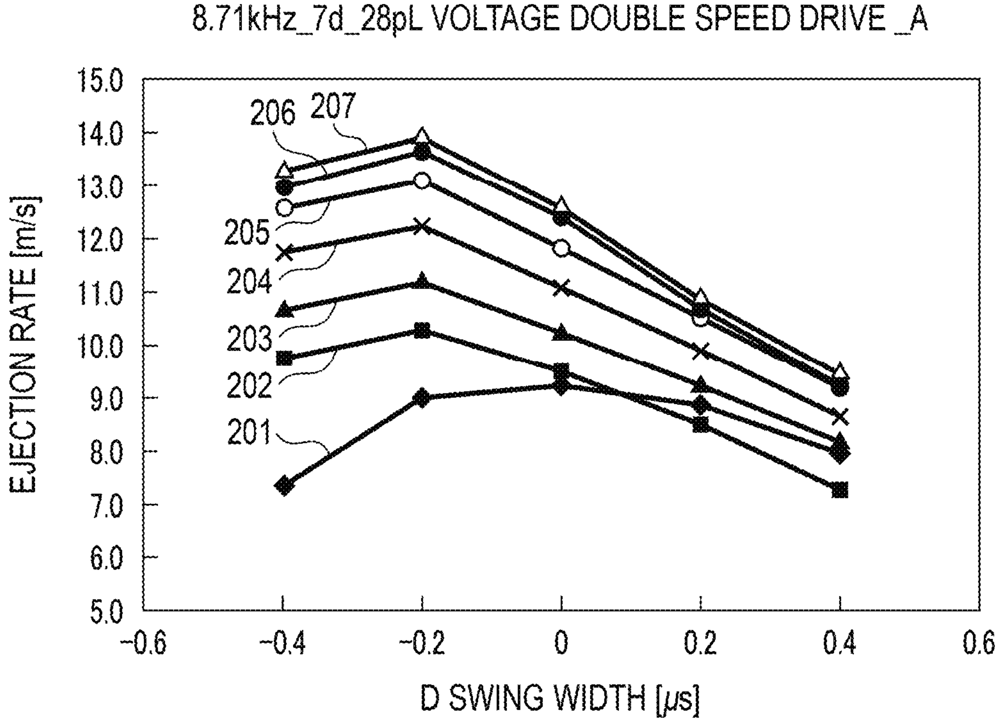
FIG. 12 is a graph of an example relationship between an expansion pulse width and an ejection speed of each drop according to an embodiment.

Next, an example of an ejection rate (ejection speed) for the ink droplets will be described with reference to FIG. 12. In the example, the head driver 100 sequentially ejects seven ink droplets in each division (that is double drive). In FIG. 12, the horizontal axis represents the swing width (μs). The vertical axis represents the ejection rate (m/s) of each drop. Here, the vertical axis is plotted as an average of the speed of each of the multiple drops in a plurality of double drives.

Graph line 201 represents the speed of the first drop. Graph line 202 represents the speed of the second drop. Graph line 203 represents the speed of the third drop. Graph line 204 represents the speed of the fourth drop. Graph line 205 represents the speed of the fifth drop. Graph line 206 represents the speed of the sixth drop. Graph line 207 represents the speed of the seventh drop.

As illustrated in FIG. 12, the ejection speed increases between swing width of 0.4 μs and −0.2 μs. In other words, the ejection speed generally decreases between −0.2 μs and 0.4 μs in swing width. Further, the ejection speed at the swing width −0.4 μs is less than the ejection speed at the swing width −0.2 μs. However, the ejection speed generally does not vary much. That is, the ejection speed does not decrease to such an extent that problems in use occur.

Figure 13:
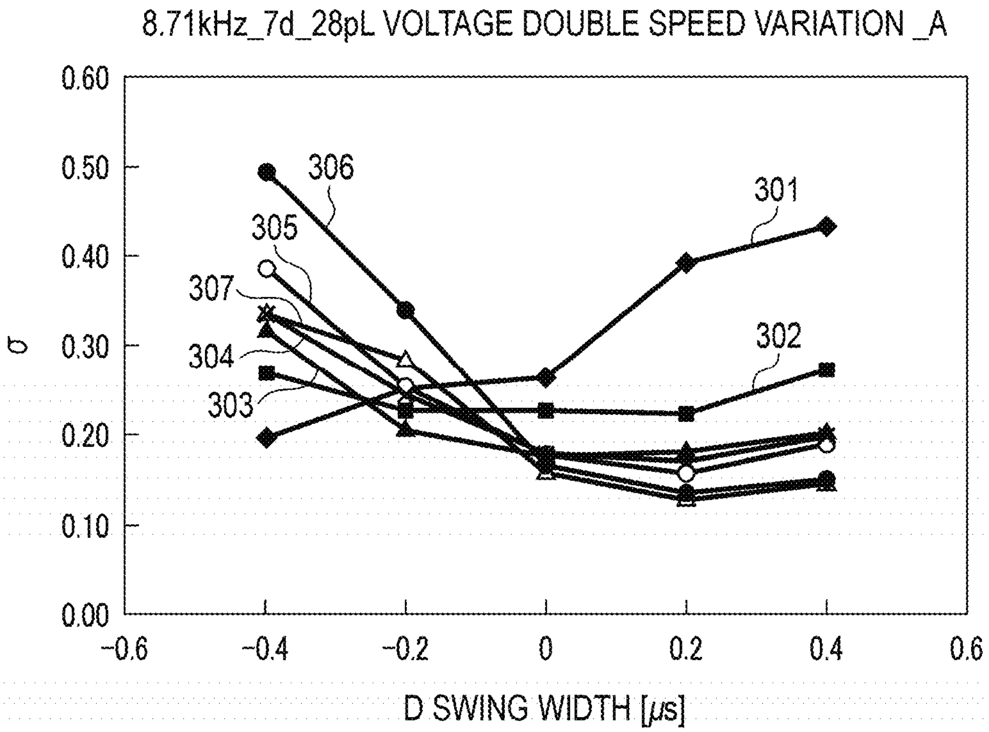
FIG. 13 is a graph of an example relationship between an expansion pulse width and a fluctuation in ejection speed of each drop according to an embodiment.

Next, a fluctuation (σ) in ejection speed of each drop will be described with reference to FIG. 13. FIG. 13 shows an example in which the ejection speed varies as the head driver 100 performs the double drive a plurality of times. In FIG. 13, the horizontal axis represents the swing width (μs). The vertical axis represents the fluctuation in the ejection speed of each drop in a series of drops.

Graph line 301 represents the fluctuation in the ejection speed of the first drop. Graph line 302 represents the fluctuation in the ejection speed of the second drop. Graph line 303 represents the fluctuation in the ejection speed of the third drop. Graph line 304 represents the fluctuation in the ejection speed of the fourth drop. Graph line 305 represents the fluctuation in the ejection speed of the fifth drop. Graph line 306 represents the fluctuation in the ejection speed of the sixth drop. Graph line 307 represents the fluctuation in the ejection speed of the seventh drop.

As illustrated in FIG. 13, the fluctuation in the ejection speed of the first drop is minimized if the swing width is −0.4 μs. The fluctuation in the ejection speed of each of the second, third, fourth, fifth and sixth drops is minimized if the swing width is 0 μs or 0.2 μs.

Figure 14:
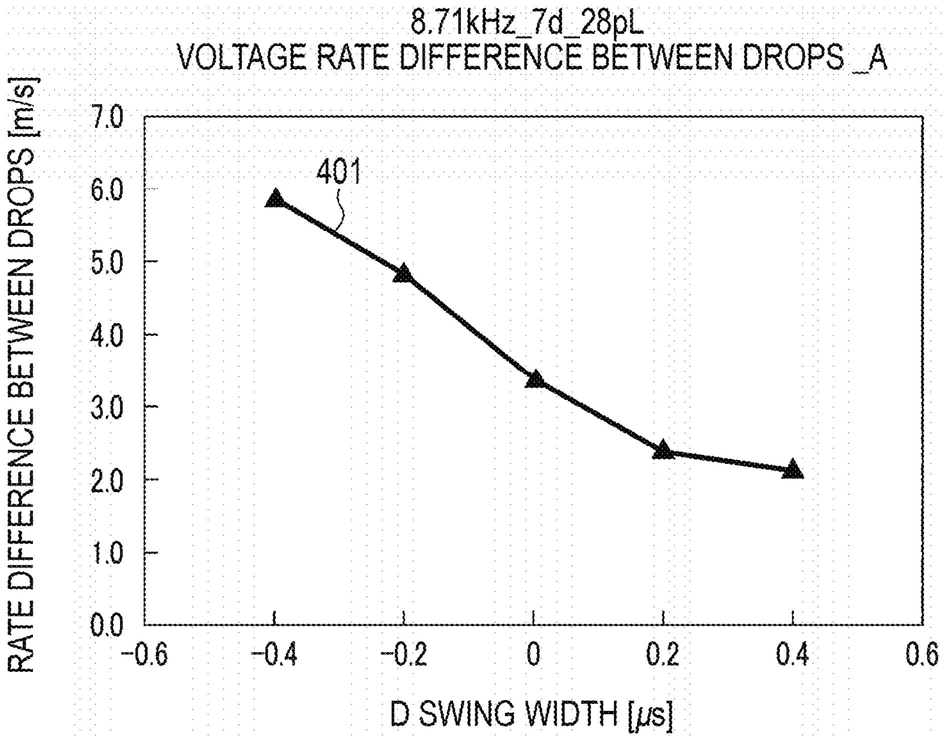
FIG. 14 is a graph of an example relationship between an expansion pulse width and a difference in ejection speed between drops according to an embodiment.

Next, an example of a difference in ejection speed between drops in series will be described with reference to FIG. 14. In FIG. 14, the horizontal axis represents the swing width (μs). The vertical axis represents the maximum difference in speed among all differences in ejection speed between drops in a series of drops.

Graph line 401 represents the maximum speed difference between drops in series at different swing widths. As illustrated by graph line 401, the speed difference increases as the swing width decreases.

Next, an example of flying states of ink droplets will be described with reference to FIG. 15. In the example, the head driver 100 ejects ink droplets from seven channels. The seven channels are referred to as channel Nos. 1 to 7, respectively. Channel Nos. 1, 4 and 7 form a first division. Channel Nos. 2 and 5 form a second division. Channel Nos. 3 and 6 form a third division.

Figure 15:
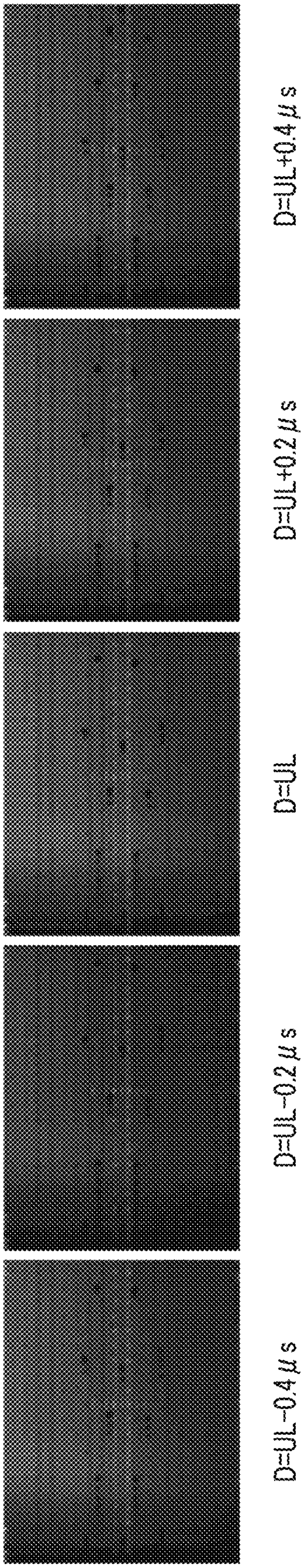
FIG. 15 depicts an example of flying states of ink droplets according to an embodiment.

In FIG. 15, the inkjet head 10 is installed at the left end of each image. Channel Nos. 1 to 7 are formed in increasing order from the top. Ink droplets are ejected from the left end to the right end of each image.

From left to right in FIG. 15, the droplet flying states were captured at D=UL−0.4 μs, D=UL−0.2 μs, D=UL, D=UL+0.2 μs, and D=UL+0.4 μs, that is, D was set from 0.75 UL to 1.25 UL.

As illustrated in the images of FIG. 15, the ink droplets are simultaneously ejected from the first division (channel Nos. 1, 4 and 7). The ink droplets are simultaneously ejected from the second division (channel Nos. 2 and 5) at a timing different from that at which the first division ejects the ink droplets. The ink droplets are simultaneously ejected from the third division (channel Nos. 3 and 6) at a timing different from that at which the first division and the second division eject the ink droplets.

As illustrated in FIG. 15, there is no difference in the flying states of the ink droplets at any value of D (in the tested range). Therefore, there is no problem with the flying states of the ink droplets in at any value of D (in the tested range).

In some embodiments, the expansion pulse may have a shape in which the drive voltage gradually increases or decreases. Similarly, the contraction pulse may have a shape in which the drive voltage gradually increases or decreases.

In some embodiments, the width P of the contraction pulse does not have to be 0.9 μs. The value of P is not limited to any specific value.

The inkjet head 10 configured according to the present embodiments applies an ejection pulse (including an expansion pulse having a width of 0.75 UL to 1.25 UL) to the drive elements 18 to eject ink droplets. The ink droplets ejected by the expansion pulse can appropriately form an image (print) on the image forming medium S without any problem in the flying states. As a result, the inkjet head 10 can reduce the width of the expansion pulse (which decreases time required by ejection pulse) to perform printing at higher speed.

While certain embodiments have been described, these embodiments have been presented by way of example only and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An inkjet head, comprising:
- an actuator configured to cause a pressure chamber to expand or contract; and
- a driver configured to apply an ejection pulse to the actuator to eject ink from the pressure chamber, the ejection pulse including:
  - an expansion pulse having a width of 0.75 to 1.25 times a pressure propagation time of the pressure chamber,
  - a rest period after the expansion pulse, and
  - a contraction pulse after the rest period, wherein
- the width of the expansion pulse is greater than a width of the contraction pulse.

2. The inkjet head according to claim 1, wherein a time between a center of the expansion pulse and a center of the contraction pulse is twice the pressure propagation time.

3. The inkjet head according to claim 1, further comprising:
- a plurality of pressure chambers; and
- a plurality of actuators corresponding to the plurality of pressure chambers, wherein
- the plurality of pressure chambers is divided into a plurality of groups, and
- the driver applies ejection pulses to actuators of each of the groups separately.

4. The inkjet head according to claim 1, wherein a plurality of expansion pulses are applied within one ejection pulse.

5. The inkjet head according to claim 1, wherein the expansion pulse, the rest period, and the contraction pulse are applied within a one drop cycle.

6. The inkjet head according to claim 1, wherein the voltage of the expansion pulse changes gradually from a maximum level to a minimum level.

7. The inkjet head according to claim 1, wherein the voltage of the contraction pulse changes gradually from a maximum to a minimum level.

8. The inkjet head according to claim 1, wherein the driver is further configured to apply an auxiliary pulse to the actuator prior to the application of the ejection pulse.

9. The inkjet head according to claim 1, wherein a width of the rest period is greater than the width of the contraction pulse.

10. A liquid ejection head, comprising:

an actuator configured to cause a pressure chamber to expand or contract in response to a drive signal; and a driver configured to apply an ejection pulse to the actuator to cause liquid to eject from the pressure chamber, the ejection pulse including:

an expansion pulse having a width of 0.75 to 1.25 times a pressure propagation time of the pressure chamber, a rest period after the expansion pulse, and a contraction pulse after the rest period, wherein a time between a center of the expansion pulse and a center of the contraction pulse is twice the pressure propagation time, and a width of the rest period is greater than a width of the contraction pulse.

11. The liquid ejection head according to claim 10, wherein a width of the expansion pulse is greater than the width of the contraction pulse.

12. An inkjet recording apparatus, comprising:

a support portion configured to support a medium on to which ink droplets are ejected; and an inkjet head including:

an actuator configured to cause a pressure chamber to expand or contract; and a driver configured to apply an ejection pulse to the actuator, the ejection pulse including:

an expansion pulse having a width of 0.75 to 1.25 times a pressure propagation time of the pressure chamber, a rest period after the expansion pulse, and a contraction pulse after the rest period, wherein the width of the expansion pulse is greater than a width of the contraction pulse.

13. The inkjet recording apparatus according to claim 12, wherein a time between a center of the expansion pulse and a center of the contraction pulse is twice the pressure propagation time.

14. The inkjet recording apparatus according to claim 12, wherein the inkjet head further includes:

a plurality of pressure chambers; and a plurality of actuators corresponding to the plurality of pressure chambers, wherein the plurality of pressure chambers is divided into a plurality of groups, and the driver applies ejection pulses to actuators of each of the groups separately.

15. The inkjet recording apparatus according to claim 12, wherein a plurality of expansion pulses are applied within one ejection pulse.

16. The inkjet recording apparatus according to claim 12, wherein the expansion pulse, the rest period, and the contraction pulse are applied within a one drop cycle.

17. The inkjet recording apparatus according to claim 12, wherein the voltage of the expansion pulse changes gradually from a maximum level to a minimum level.

18. The inkjet recording apparatus according to claim 12, wherein and the voltage of the contraction pulse changes gradually from a maximum to a minimum level.

19. The inkjet recording apparatus according to claim 12, wherein the driver is further configured to apply an auxiliary pulse to the actuator prior to the application of the ejection pulse.

20. The inkjet recording apparatus according to claim 12, wherein a width of the rest period is greater than the width of the contraction pulse.

* * * * *